Patented Apr. 1, 1924.

1,489,026

UNITED STATES PATENT OFFICE.

ALEXANDER L. DUVAL D'ADRIAN, OF WASHINGTON, PENNSYLVANIA.

COMPOSITION FOR PRODUCING GLASS.

No Drawing.    Application filed October 13, 1921. Serial No. 507,508.

*To all whom it may concern:*

Be it known that I, ALEXANDER L. DUVAL D'ADRIAN, a citizen of the Republic of France, residing at Washington, in the county of Washington and State of Pennsylvania, have invented certain new and useful Improvements in Compositions for Producing Glass, of which the following is a specification.

My invention relates to a composition or batch for use in the production of glass.

I have discovered that particularly satisfactory results are obtained in the production of glass, if the natural double silicates of the alkali metals and the alkaline earth metals, such as, sodium and calcium, for example the mineral known as pectolite, are employed as constituents of the glass. It has been found satisfactory to add a relatively small amount by weight of the natural double silicates of sodium and calcium to a batch of the usual glass mixture, or a relatively small amount by weight of such batch may be added to a relatively large amount of natural double silicates of sodium and calcium. The following is an illustration of a composition for producing glass in accordance with my invention:

| | Lbs. |
|---|---|
| Sand | 1000 |
| Soda ash | 365 |
| Limestone | 205 |
| Pectolite or other natural double silicates of sodium and calcium | 50–500 |

These ingredients are thoroughly mixed and heated to the fusing point to produce the glass, in accordance with the usual heating methods.

Another example of the composition for producing glass embodying my invention is as follows:

| | Lbs. |
|---|---|
| Natural double silicates of sodium and calcium such as pectolite | 1000 |
| Sand | 200 |
| Soda ash | 70 |
| Limestone | 40 |

The ingredients of this second composition are of course thoroughly mixed and heated to the fusing point, in accordance with the well known heating methods.

The amount of natural double silicates of sodium and calcium to be added may be widely varied, and will depend upon the nature of the glass desired, and the condition under which the glass is to be worked.

I have discovered that by the use of these natural double silicates, that I can obtain a glass of a higher calcium content, than can be obtained by any other method now known, and that the glass in which these double silicates are present has a relatively low melting point.

In the two illustrations of the invention, it will be seen that the natural double silicates are combined with the usual glass mixture or batch, and that the amount of the double silicates are widely varied.

It is to be understood that the forms of my invention herewith described, are to be taken as preferred embodiments of my invention, and that various changes may be resorted to in the proportions of the ingredients, and that chemical equivalents may be employed, without departing from the spirit of my invention or the scope of the subjoined claims.

Having thus described my invention, I claim:

1. A composition for producing glass, comprising the constituents of the usual glass batch, and the natural double silicate of sodium and calcium known as pectolite.

2. A composition for producing glass, comprising sand, soda ash, limestone, and the natural double silicate of sodium and calcium known as pectolite.

In testimony whereof I affix my signature.

ALEXANDER L. DUVAL d'ADRIAN.